US009980217B2

(12) United States Patent
Svedman et al.

(10) Patent No.: US 9,980,217 B2
(45) Date of Patent: May 22, 2018

(54) METHOD AND SYSTEM FOR OPPORTUNISTIC PROBING

(71) Applicants: ZTE WISTRON TELECOM AB, Kista (SE); ZTE (TX) INC., Austin, TX (US)

(72) Inventors: Patrick Svedman, Kista (SE); Thorsten Schier, Kista (SE); Yonghong Gao, Kista (SE); Jan Johansson, Kista (SE); Aijun Cao, Kista (SE); Bojidar Hadjiski, Kista (SE)

(73) Assignee: ZTE WISTRON TELECOM AB, Kista (SE)

( * ) Notice: Subject to any disclaimer, the term of this patent is extended or adjusted under 35 U.S.C. 154(b) by 24 days.

(21) Appl. No.: 15/033,887

(22) PCT Filed: Oct. 31, 2014

(86) PCT No.: PCT/US2014/063472
§ 371 (c)(1),
(2) Date: May 2, 2016

(87) PCT Pub. No.: WO2015/066501
PCT Pub. Date: May 7, 2015

(65) Prior Publication Data
US 2016/0269990 A1 Sep. 15, 2016

Related U.S. Application Data

(60) Provisional application No. 61/898,572, filed on Nov. 1, 2013.

(51) Int. Cl.
H04W 52/02 (2009.01)
H04W 16/32 (2009.01)
(Continued)

(52) U.S. Cl.
CPC ....... *H04W 52/0206* (2013.01); *H04L 5/0048* (2013.01); *H04W 16/32* (2013.01); *H04W 76/048* (2013.01); *Y02B 60/50* (2013.01)

(58) Field of Classification Search
CPC H04L 5/0048; H04W 16/32; H04W 52/0206; H04W 76/048
See application file for complete search history.

(56) References Cited

U.S. PATENT DOCUMENTS

2010/0144358 A1* 6/2010 Iguchi ................ H04W 76/048
455/450
2011/0053604 A1* 3/2011 Kim ...................... H04W 16/16
455/450

(Continued)

*Primary Examiner* — Jenee Holland
(74) *Attorney, Agent, or Firm* — Duane Morris LLP

(57) ABSTRACT

A new approach to generating a probing signal by a cell in a heterogeneous network (HetNet) deployment is proposed. A small cell in the HetNet may be switched off by a base station when the small cell is not needed. The small cell is configured to alternate between an off-state and on-state. The small cell maintains the on-state for a predetermined probing period and maintains the off-state for a predetermined off period. The small cell may switch between the on-state and the off-state periodically. The small cell may be activated during a predetermined off period to transmit data to a user device.

21 Claims, 7 Drawing Sheets

(51) Int. Cl.
*H04L 5/00* (2006.01)
*H04W 76/04* (2009.01)

(56) References Cited

U.S. PATENT DOCUMENTS

| | | | | |
|---|---|---|---|---|
| 2013/0040625 A1* | 2/2013 | Godin | ................... | H04W 16/08 455/418 |
| 2013/0114398 A1* | 5/2013 | Wang | ................... | H04W 76/048 370/221 |
| 2013/0203425 A1* | 8/2013 | De Domenico | ...... | H04W 16/32 455/449 |
| 2013/0250908 A1* | 9/2013 | Bach | ................. | H04W 52/0206 370/331 |
| 2014/0170965 A1* | 6/2014 | Li | ......................... | H04W 28/08 455/7 |
| 2014/0199982 A1* | 7/2014 | Hahn | ................... | H04W 16/02 455/418 |
| 2014/0213239 A1* | 7/2014 | Hahn | ..................... | H04W 16/08 455/418 |
| 2014/0242989 A1* | 8/2014 | Cai | ....................... | H04W 52/54 455/436 |
| 2014/0286218 A1* | 9/2014 | Park | ................... | H04W 52/0203 370/311 |
| 2014/0301301 A1* | 10/2014 | Cheng | ................... | H04L 5/0048 370/329 |
| 2014/0335845 A1* | 11/2014 | Alex | ..................... | H04W 24/02 455/418 |
| 2014/0364127 A1* | 12/2014 | Yin | ................... | H04W 52/0206 455/438 |
| 2015/0009877 A1* | 1/2015 | Chiang | ............. | H04W 52/0206 370/311 |
| 2015/0146596 A1* | 5/2015 | Byun | ................. | H04W 52/0206 370/311 |
| 2015/0189574 A1* | 7/2015 | Ng | ........................ | H04W 24/08 370/252 |
| 2015/0359036 A1* | 12/2015 | Seo | ..................... | H04W 76/048 370/329 |

* cited by examiner

METHOD AND SYSTEM FOR OPPORTUNISTIC PROBING

RELATED PATENT APPLICATIONS

This application is a 371 National Phase Application from International Application No. PCT/US2014/063472, filed Oct. 31, 2014 and claims benefit of priority under 35 U.S.C. § 119(e) to Provisional Application No. 61/898,572, entitled "Method and System for Opportunistic Probing," filed Nov. 1, 2013, which is incorporated by reference herein in its entirety.

FIELD OF THE INVENTION

This present invention is related to cellular communication systems, such as heterogeneous networks where multiple low-power nodes are deployed within the coverage of a macro base station.

BACKGROUND OF THE INVENTION

Cellular communication systems provide not only voice services, but also mobile broadband services all over the world. As more and more applications executable on cell phones are emerging, which consume higher and higher amounts of data, demands for mobile broadband data services have been increasing exponentially, requiring operators of cellular communication systems to improve data throughput wherever and whenever possible.

As the spectrum efficiency for the point-to-point link approaches its theoretical limit, one way to improve data throughput of a cellular communication system is to split big cells into smaller and smaller cells. When cells becomes closer to each other, however, adjacent cell interferences become more severe, and the cell splitting gain saturates. Furthermore, it is becoming increasingly difficult and costly for the operators to acquire new sites to install base stations. Therefore, cell-splitting cannot fulfil the demands for mobile broadband data services.

Recently a new type of cellular communication system deployment, called Heterogeneous Network or HetNet in short, has been proposed. In a HetNet, an additional tier including multiple low-power nodes (LPNs) is added into the cellular communication system within the coverage area of an existing macro base station. The macro base station monitors, controls, and schedules communications with the LPNs in a master-slaves relationship in the HetNet in order to have better interference management and resource allocation, etc.

In a HetNet, not all of the possibly deployed nodes are needed all of the time. At low traffic loads, one or more deployed low power nodes may be switched off. Switching off unneeded low power nodes provides a reduction in network power consumption and a reduction of mutual interference between the nodes. In legacy versions of the 3GPP standard, a mechanism has been introduced to switch cells on and off. LTE base stations (eNodeB) can also send activation and deactivation requests to each other.

When a legacy small cell is switched off, the small cell is not transmitting the legacy signals, such as primary and second synchronization signals (PSS/SSS) and cell specific reference signals (CRS). When the small cell is switched off, legacy user equipment (UE) cannot detect the small cell or perform radio resource management (RRM) measurements on the small cell.

In a legacy system, a cell probing method may be implemented to allow UEs to identify small cells that are switched off. In a cell probing method, small cells transmit a signal, such as a PSS, SSS, CSR, etc. signal for a certain time period. A UE can detect and measure the transmitted signal for RRM measurements and/or to identify a small cell for handoff.

SUMMARY OF THE INVENTION

In various embodiments, a small cell alternates between an off-state and an on-state. The small cell maintains the on-state for a predetermined probing period. The predetermined probing period is sufficiently long for a UE to detect the small cell and perform RRM measurements on the small cell. The small cell transitions to the off-state after the predetermined probing period. The small cell waits a predetermined off period and transitions to the on-state for a predetermined probing period. The predetermined off period is defined as a period during which the small cell is not actively transmitting one or more signals required for UE discovery. The small call may periodically switch between the on-state and the off-state.

In some embodiments a small cell has been active (i.e. on-state) to transmit data. After a time that is shorter than the predetermined probing period it has finished to transmit the data and could go back to the off-state. But instead, the cell is kept in on-state for an extension time so that it has been active for at least the probing period. This gives other UEs the chance to discover this small cell.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

Embodiments of the invention are illustrated by way of examples and not by way of limitation in the figures of the accompanying drawings in which like references indicate similar elements. It should be noted that references to "an" or "one" or "some" embodiment(s) in this disclosure are not necessarily to the same embodiment, and such references mean at least one.

In the following description of exemplary embodiments, reference is made to the accompanying drawings which form a part hereof, and in which it is shown by way of illustration of specific embodiments in which the invention may be practiced. It is to be understood that other embodiments may be utilized and structural changes may be made without departing from the scope of the preferred embodiments of the invention.

The present invention is directed towards systems and methods for activating and deactivating cells in networks. In some embodiments, the network comprises a HetNet with small cells. In order to reduce energy consumption and to avoid interference, the small cells are only activated when needed by the network. However, a UE must be able to detect the presence of a small cell, even when the cell is not needed. The small cell is activated at a predefined period for probing. Embodiments of the invention are described herein in the context of one or more practical applications, such as, for example, a cellular network. The invention, however, is not limited to such practical applications and the methods described herein may also be utilized in other applications or systems such as mobile-to-mobile communications, wireless local loop communications, wireless relay communications, wireless backhaul communications, heterogeneous, and homogenous networks as non-limiting examples.

Figure 1:
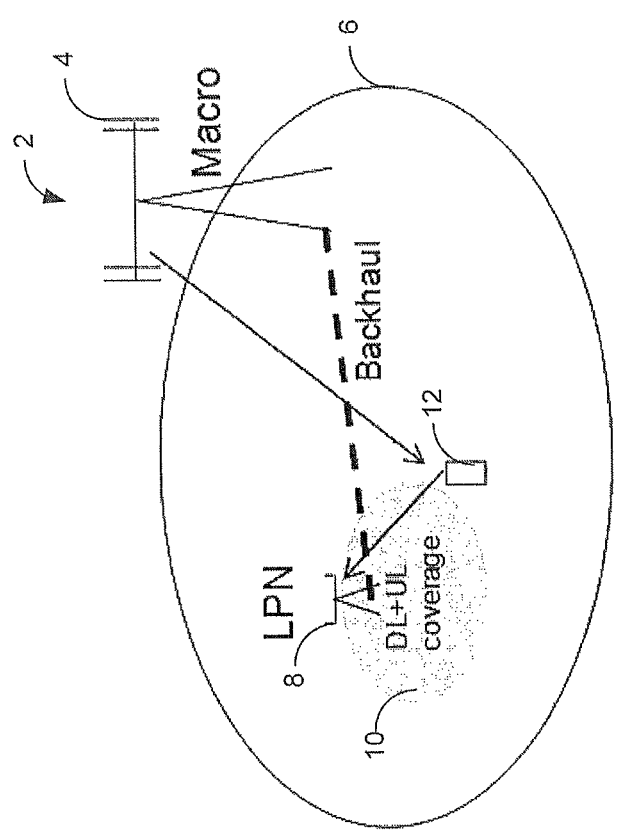
FIG. 1 illustrates one embodiment of a wireless heterogeneous network (HetNet).

FIG. 1 illustrates one embodiment of a HetNet (heterogeneous network) cellular communication system 2. The system 2 comprises a macro base station 4 having a coverage area 6. At least one low-power node (LPN) 8, or small cell, is located within the coverage area 6 of the macro station 4. The LPN 8 comprises an uplink/downlink (UL/DL) coverage area 10. In some embodiments, an uplink (UL) coverage area of the LPN 8 may be wider than a symmetric uplink/downlink (UL/DL) coverage area 10. A user device (UE) 12 may be located within the coverage area 10 of the small cell 8.

An LPN 8 may be in either an on-state or an off-state. The on-state comprises a first power level. An active LPN may maintain an on-state to continuously transmit one or more signals, such as, for example, PSS, SSS, and/or CSR signals. In an off state, the LPN 8 comprises a second, lower power level. In some embodiments, the second power level is zero. At low traffic loads, the LPN 8 may be switched off, i.e., transitioned to the off state. Switching off an unneeded LPN 8 provides a reduction in network power consumption and a reduction of mutual interference between the nodes 4, 8. When the LPN 8 is switched off, the cell 8 is referred to as an off cell. In some embodiments, an LPN 8 is switched off when the LPN 8 is not needed for providing coverage within the network. The macro base station 4 may activate the LPN 8 by transmitting a signal to the LPN 8 when the LPN 8 is required, for example, to provide coverage within the network and/or to decrease load on other nodes.

In one embodiment, an off cell 8 may be temporarily turned on for one of two purposes: probing or data. Probing activation turns on the cell 8 for the purpose of allowing UEs 12 to detect and measure on the cell 8. Data activation turns on the cell 8 to serve one or more UEs 12 with data. In some embodiments, the cell 8 may be initially turned on for one purpose, such as probing, and transition to a second purpose, such as data, without being turned off. Although the network 2 is illustrated as a heterogeneous network (HetNet) comprising a macro cell and one or more micro cells, it will be recognized that the systems and methods described herein may be applied to any network, such as, for example, a homogenous network having only macro coverage, a heterogeneous network having only small cell coverage, and/or any other suitable network.

Figure 2:
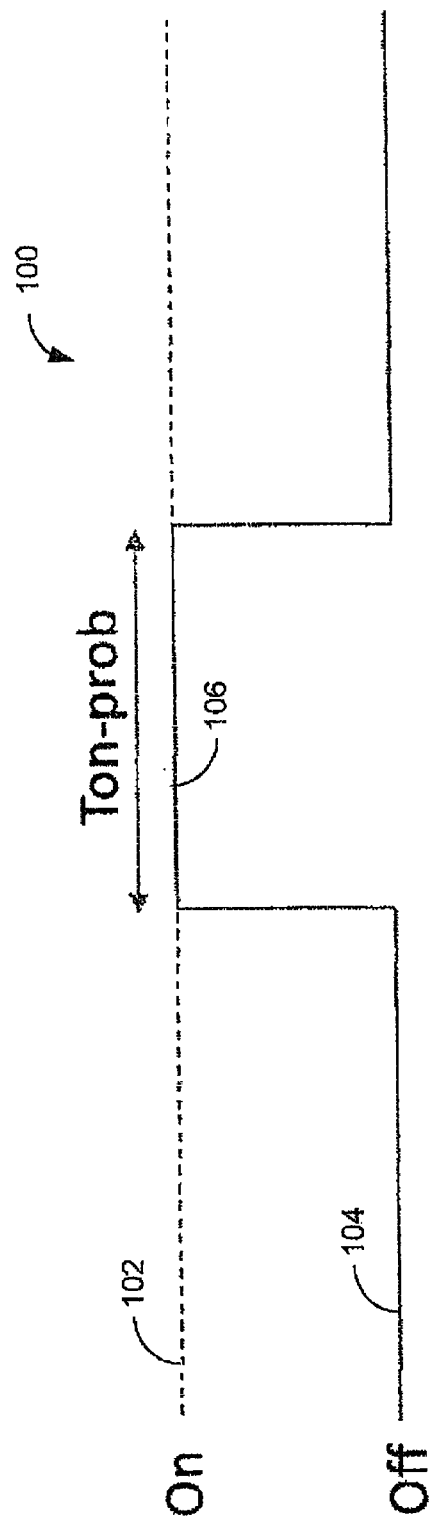
FIG. 2 illustrates one embodiment of a small cell probing interval.

FIG. 2 illustrates one embodiment of a cell probing interval 106. The cell probing interval 106 may be implemented by an off cell, such as, for example, the LPN 8 illustrated in FIG. 1. The cell 8 may be transitioned from the off-state 104 to an on-state 102 for a small cell probing interval 106 ($T_{on\text{-}prob}$). The on-state 102 comprises a first power level and the off-state 104 comprises a second power level. In some embodiments, the second power level is equal to zero. $T_{on\text{-}prob}$ 106 is selected such that a UE 12 located in the cell coverage area 10 has sufficient time to locate and measure the cell 8. The small cell maintains an on-state 102 for a predetermined time period $T_{on\text{-}prob}$, and transitions to an off-state 104 after $T_{on\text{-}prob}$ 106 has elapsed.

In some embodiments, a cell 8 in an off-state 104 transmits one or more signals while in the off state, such as, for example, a discovery signal. A discovery signal may comprise, for example, a signal having a low average power and a low resource use, such as, for example, by having a long periodicity, narrow frequency band, and/or any other suitable low-power, low-resource characteristic or any combination thereof.

In some embodiments, the duration of $T_{on\text{-}prob}$ 106 comprises a predetermined period sufficient to allow a set of UEs within the coverage area 10 to find the cell 8. The set of UEs may or may not include all UEs that could potentially detect the cell 8. For example, in some embodiments, the set of UEs is determined by the UE measurement configurations in the system. In some embodiments, $T_{on\text{-}prob}$ 106 is adaptable, i.e., different probing intervals may each have a different $T_{on\text{-}prob}$ 106. For example, in some embodiments, the probing period $T_{on\text{-}prob}$ 106 may be adjusted based on the set of UEs located within the coverage area of the cell 8 and/or the base station 4. Different UEs may require different $T_{on\text{-}prob}$ 106 durations to identify and measure a cell. For example, different UEs may have different DRX configurations and/or different numbers of inter-frequency carriers the UE monitors. The probing interval $T_{on\text{-}prob}$ 106 may be shorter than what is required for a first set of UEs to identify and measure a cell while still being sufficient for cell identification and measurement for a second set of UEs.

In some embodiments, a cell 8 is switched on to serve one or more UEs 12 with data. For a cell 8 that operates an on/off scheme as illustrated in FIG. 2, the cell may be switched off after a predetermined idle period. For example, if the cell 8 is activated to transmit data to one or more UEs 12, the cell 8 will transmit the data during a transmission period and will be transitioned to an off-state 104 after all data has been transmitted. In some embodiments, $T_{data}$ defines the duration from when the cell is switched on until the cell is switched off. Typically, $T_{data}$ is different each time a cell is turned on to transmit data, as the amount of data transmitted by the cell 8 varies.

Figure 3:
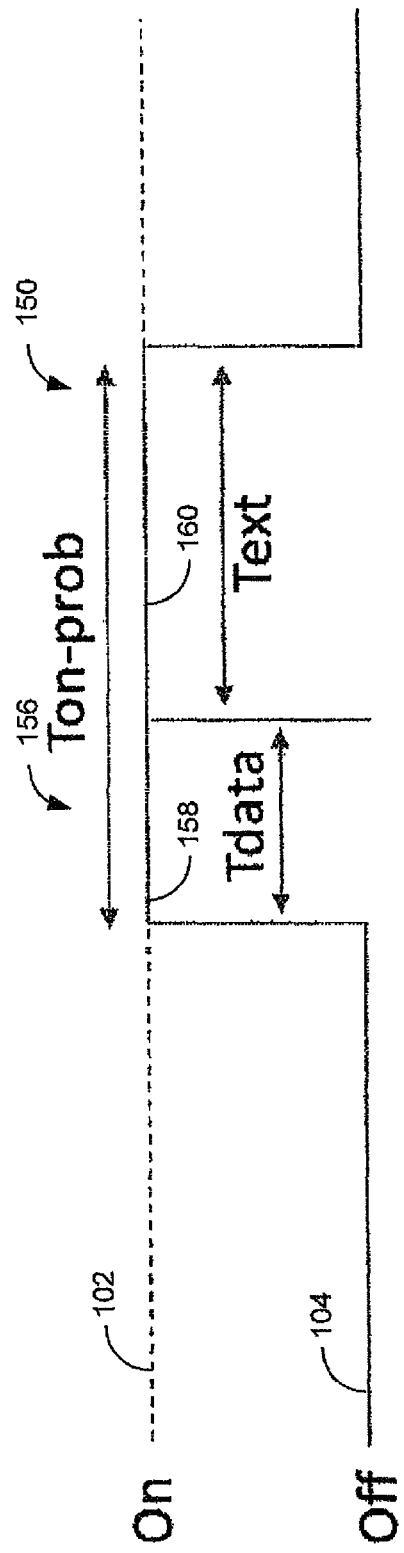
FIG. 3 illustrates one embodiment of a cell probing pattern having a data transmission extended by an extension period.

FIG. 3 is a graph 150 illustrating one embodiment of a cell activated for one or more probing intervals 156 and one or more data transmissions 158. In some embodiments, a cell 8 may be activated to transmit data for a time period, $T_{data}$ 158, that is less than a probing period, $T_{on\text{-}prob}$ 156. If $T_{data}$ 158 is less than $T_{on\text{-}prob}$ 156, a UE may not have sufficient time to detect and measure the cell 8. In order to provide adequate time for a UE to detect and measure the cell 8, in some embodiments, the on-time of the cell 8 is extended by a value, $T_{ext}$ such that $T_{data}+T_{ext} \geq T_{on-prob}$.

As illustrated in FIG. 3, if a cell is activated for data transmission for a time period $T_{data}$ that is less than the probing period $T_{on-prob}$ 156, an extension period $T_{ext}$ 160 is added to extend the on-period of the cell to be at least equal to $T_{on-prob}$ 156. By extending $T_{data}$ 158, efficiency of the network is improved. For example, network power consumption and interference can be reduced as fewer activations are required to allow UEs to identify and measure the cell. In embodiments without $T_{ext}$, a cell may be deactivated after $T_{data}$, preventing UEs from identifying and measuring the cell 8, and requiring an additional $T_{on-prob}$ activation to allow detection, increasing power consumption and network interference.

Figure 4:
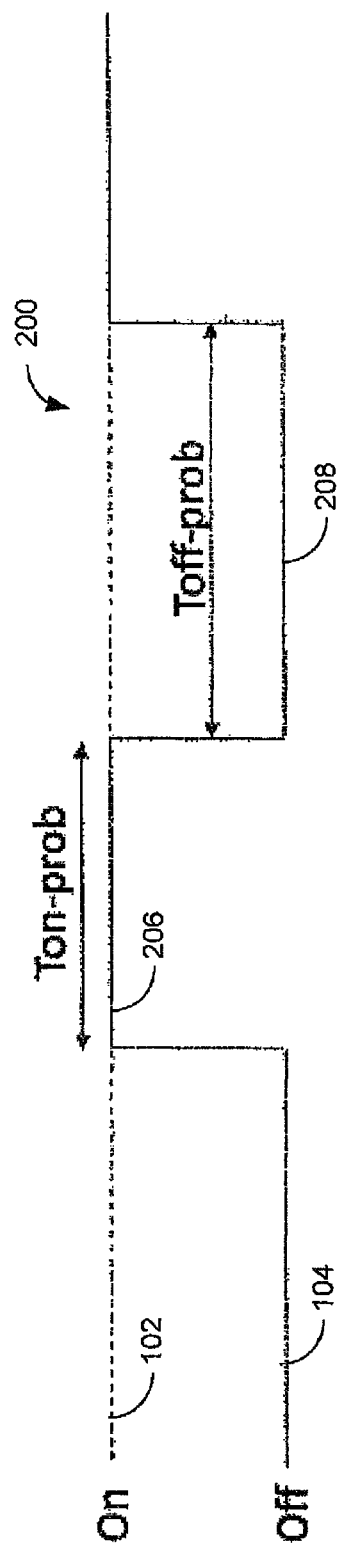
FIG. 4 illustrates one embodiment of a cell probing pattern having a predetermined probing period $T_{on-prob}$ and a predetermined off period $T_{off-prob}$.

In some embodiments, an off cell 8 (i.e., a cell that is not currently needed by the network and has been turned off) repeats probing intervals to allow UEs to perform detection and measurement of the cell 8 over time. The probing intervals may be repeated periodically and/or non-periodically. FIG. 4 illustrates one embodiment of a cell probing pattern 200 having a predetermined probing period $T_{on-prob}$ 206 and a predetermined off period $T_{off-prob}$ 208. $T_{on-prob}$ 206 is equal to a period at least sufficient for a UE 12 in the coverage area 10 to detect and measure the cell 8. After the predetermined probing interval $T_{on-prob}$ 206 has elapsed, the cell transitions to an off-state for a predetermined period $T_{off-prob}$ 208. In periodic embodiments, $T_{off-prob}$ is constant. In non-periodic embodiments, $T_{off-prob}$ may be variable.

In some embodiments, $T_{off-prob}$ is determined by one or more network parameters. For example, the repetition pattern of $T_{off-prob}$ 208 and $T_{on-prob}$ 206 may be determined by, for example, UE mobility or UE measurement configurations. In some embodiments, $T_{off-prob}$ is the maximum time that is permitted to elapse between two probing intervals $T_{on-prob}$ 206. For example, in some embodiments, a cell must initiate a new probing interval, $T_{on-prob}$ 206 at least $T_{off-prob}$ 208 after the previous probing interval. The predetermined off period $T_{off-prob}$ 208 comprises as a period during which the small cell is not actively transmitting one or more signals required for legacy UE discovery.

Figure 5:
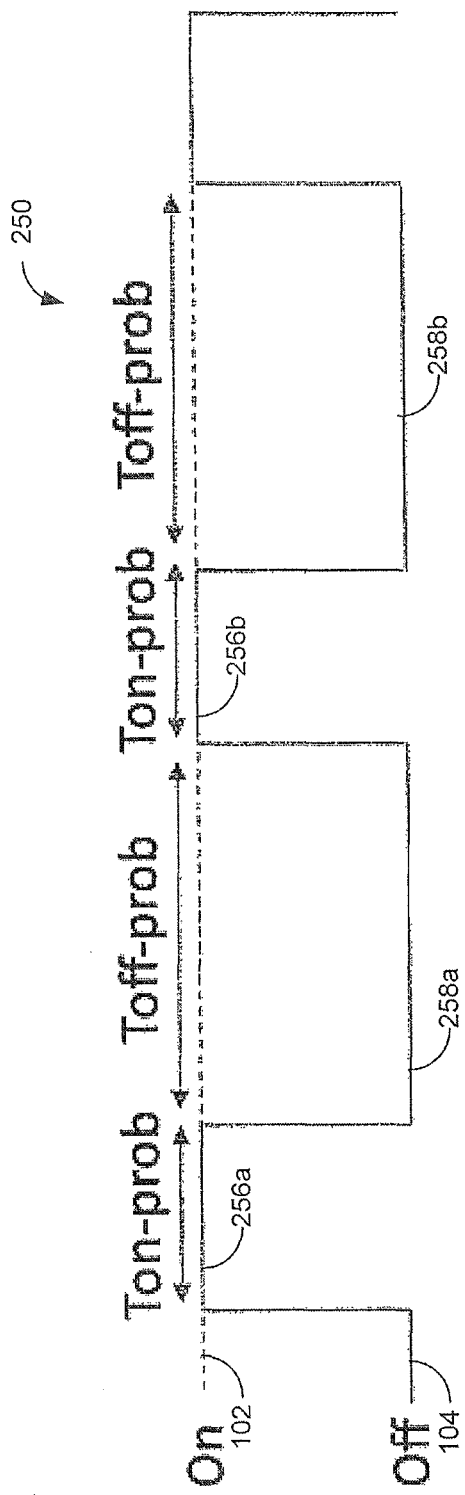
FIG. 5 illustrates one embodiment of a periodic cell probing pattern.

FIG. 5 illustrates one embodiment of a periodic probing pattern 250. The periodic probing pattern 250 comprises a repeating pattern of probing periods $T_{on-prob}$ 256a, 256b and off periods $T_{off-prob}$ 258a, 258b. The periodicity of the cell is $T_{off-prob}+T_{off-prob}$. The maximum allowed duration for the cell to be in the off-state 104 is $T_{off-prob}$ 258a, 258b. In some embodiments, the cell continues the periodic probing pattern 250 until the network indicates the cell should switch from an off cell to an on cell. In other embodiments, the period probing pattern 250 occurs for a predetermined time period after the cell 8 is turned off by the network 2.

Figure 6:
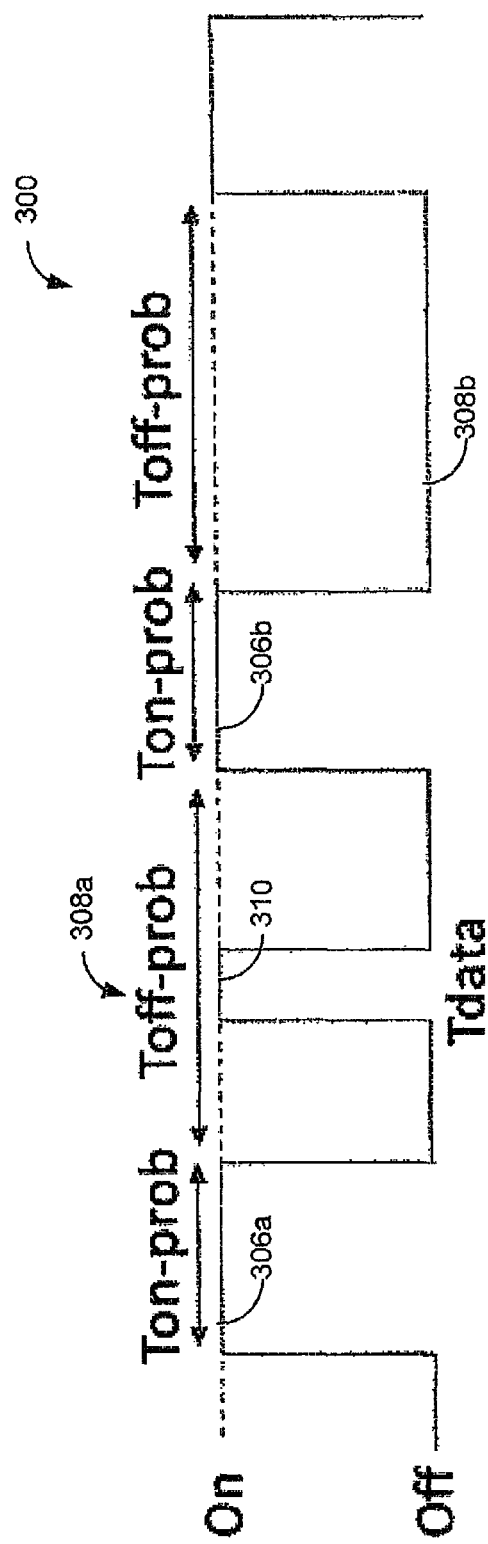
FIG. 6 illustrates one embodiment of a periodic cell probing pattern having a data transmission during a $T_{off-prob}$ period.

In some embodiments, the cell may be activated to transmit data during an off period $T_{off-path}$ 258a, 258b. For example, as illustrated in FIG. 6, during an off period $T_{off-prob}$ 308a, a cell is activated for a data transmission. The cell 8 transitions to the on-state 102 to transmit data for the period $T_{data}$. The cell 8 transitions to the off state after $T_{data}$ has elapsed. The $T_{off-period}$ 308a continues to run and the cell transitions back to the on state during the second $T_{on-prob}$ 306a. The cell activation pattern 300 illustrated in FIG. 6 may result in unnecessary activations for probing following activation of the cell for data transmission. In some embodiments, the cell 8 is configured to implement an opportunistic probing pattern to reduce unnecessary activations.

In other embodiments, when a cell receives data for transmission to a UE during a $T_{off-prob}$, the cell delays transmission of the data until the next $T_{on-prob}$. By delaying transmission of the data until the $T_{off-prob}$ period has elapsed, the cell avoids additional activation resulting in low power consumption and reduced interference. Although in this embodiments a UE is not served immediately, immediate servicing of data is not required for all services. In some embodiments, the cell may selectively delay transmission of data depending on the type of data and a priority level of the data.

Figure 7:
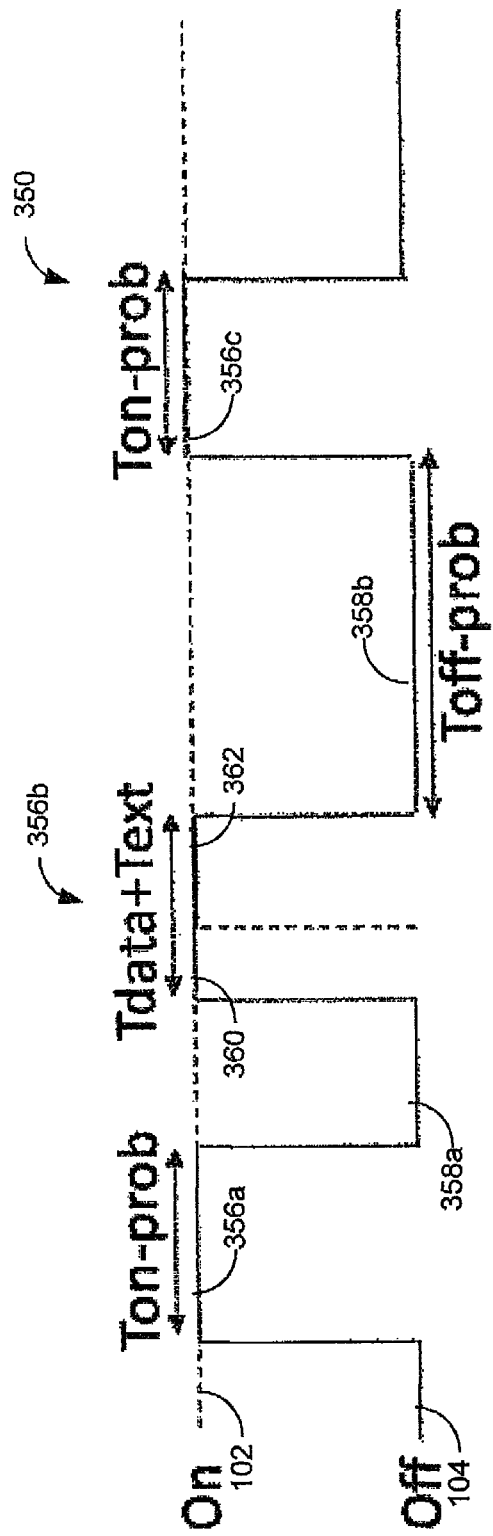
FIG. 7 illustrates one embodiment of an opportunistic probing pattern.

FIG. 7 illustrates one embodiment of an opportunistic probing pattern 350 implementable by an off cell 8. An opportunistic probing pattern 350 comprises a periodic probing pattern that inserts dynamically created $T_{on-prob}$ periods into the periodic probing pattern. For example, the cell 8 implements a periodic probing pattern having a predetermined $T_{on-prob}$ 356a-356c period and a $T_{off-prob}$ 358a, 358b period. During a first off period $T_{off-prob}$ 358a, the cell 8 is activated to transmit data for a period $T_{data}$ 360 and the $T_{off-prob}$ 358a is aborted before the entire $T_{off-prob}$ period has elapsed. The data transmission period $T_{data}$ 360 is less than the probing period $T_{on-prob}$. The cell 8 extends the data transmission period $T_{data}$ 360 by an extension period $T_{ext}$ 362 to generate a dynamically created probing period $T_{on-prob}$ 356b such that $T_{data}+T_{ext}=T_{on-prob}$. The cell 8 delays the next probing period, $T_{on-prob}$ 356c, for a by an off period $T_{off-prob}$ 358b from the end of the dynamically created probing period $T_{on-prob}$ 356b. By delaying the next probing activation $T_{on-prob}$ 356c, the cell 8 is only active for the minimum required time for meeting the demands of probing and data transmission, reducing power consumption and network congestion.

In some embodiments, if a cell 8 is activated for data transmission $T_{data}$ 360 and extended by $T_{ext}$ 362 to create a valid probing interval $T_{on-prob}$ 356b, the generated probing interval $T_{on-prob}$ 356b is generated without altering the existing probing interval pattern. In other words, dynamically created probing intervals, such as $T_{on-prob}$ 356b, do not change the already defined probing interval pattern and the next periodic probing interval, $T_{on-prob}$ 356c, will occur as though the dynamically created interval had not occurred, i.e., $T_{on-prob}$ 356c occurs an integer multiple of $T_{off-prob}$ 358b after the first probing period $T_{on-prob}$ 356a. The dynamically created probing intervals provide more instances for RRM measurements by a UE.

In some embodiments, only a subset of the data intervals $T_{data}$ 360 are extended to generate a dynamically created probing period $T_{on-prob}$ 356b. For example, in some embodiments, only data intervals $T_{data}$ 360 having at least a minimum duration, occurring at least a minimum time period after a probing period, and/or being at least a certain time from the next probing activation, are extended.

In some embodiments, one or more classes of UEs 12 may be located within the coverage area 10 of the cell 8. For example, in some embodiments, the classes of UEs 12 within the coverage area 10 comprise off-discovery UEs and on-discovery UEs. An off-discovery UE comprises a UE for which cell detection and measurement can be performed, either by the UE or the network, even if a cell 8 is turned off. An on-discovery UE comprises a UE for which cell detection and measurement can only be performed, either by the UE or the network, if the cell 8 is turned on.

In one embodiment, off-discovery UEs use a discovery signal transmitted by an off cell 8 to perform cell detection and measurement. The off cell 8 may transmit the discovery signal while remaining in a low-power off state. In another embodiment, the cell detection and measurement of off-discovery UEs is performed by using signals transmitted by the UE 12 and received in the off cell 8. The cell 8 may maintain a receiver in an on-state to receive signal transmitted by off-discovery UEs. In some embodiments, data transmission intervals having a period $T_{data} < T_{on-prob}$ are generated primarily from serving off-discovery UEs which have already performed cell detection and measurement prior to the cell 8 being activated. Off-discovery UEs can be served with data more rapidly than on-discovery UEs. In some embodiments, on-discovery UEs may comprise, for example, legacy UEs that are not capable of discovery signal detection and measurement from off cells.

In some embodiments, the probing parameters, $T_{on-prob}$ and $T_{off-prob}$, are configured based on the types of UEs 12 within or close to the coverage area 10 of the cell 8. The probing parameters may be adjusted based on the capabilities of the UEs (e.g., legacy vs. current standards), cell search and measurement configurations of the UEs, such as, for example, measurement gap configurations, DRX pattern, number of configured carriers to monitor, etc., and/or any other suitable UE parameter.

The probing pattern implemented by a cell 8 is backwards compatible for on-discovery UEs. In some embodiments, the decision to switch a cell 8 on or off is made by the base station 4 that controls the cell 8. Deciding when to turn a cell 8 on or off is implementation specific. The information used as input to the a switching algorithm configured to control a cell 8 may include one or more parameters, such as, for example, inter-site signaling (for example, using X2 or S1), an OAM policy, UL IoT measurements, UE positioning information, UE RRM measurements, packet intervals, and/or any other suitable parameter. In some embodiments, different information may be available for different UEs.

While various embodiments of the invention have been described above, it should be understood that they have been presented by way of example only, and not of limitation. Likewise, the various diagrams may depict an example architectural or other configuration for the invention, which is done to aid in understanding the features and functionality that can be included in the invention. The present invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

One or more of the functions described in this document may be performed by an appropriately configured module. The term "module" as used herein, refers to software that is executed by one or more processors, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

What is claimed is:

1. A system to support on/off triggering in a wireless network deployment, comprising:
   a wireless communication cell, which in operation:
      transitions to an on-state to transmit a probing signal for a predetermined probing period; and
      transitions to an off-state after the predetermined probing period and maintains the off-state for a predetermined off-period;
   wherein the system alternates between the on-state and the off-state until switched on by a base station, and
   wherein the predetermined probing period and the predetermined off-period are selected based on one or more types of user devices located within a coverage area of the wireless communication cell.

2. The device of claim 1, wherein the probing signal comprises one or more signals configured to allow a user device to detect and measure the wireless communication cell.

3. The device of claim 2, wherein the wireless communication cell alternates between the on-state and the off-state at a predetermined periodic rate.

4. The device of claim 3, wherein the wireless communication cell, in operation, transitions to the on-state to transmit data to one or more user devices, wherein the data is transmitted over a data period, and wherein the data period occurs at least partially during a predetermined off-period.

5. The device of claim 4, wherein if the data period is less than the predetermined probing period, the wireless communication cell extends the data period by an extension period to generate a dynamic probing period, wherein the dynamic probing period is at least equal to the predetermined probing period.

6. The device of claim 5, wherein after generating the dynamic probing period, the wireless communication cell delays a subsequent probing period for at least a predetermined off-period after the dynamic probing period.

7. The device of claim 5, wherein the wireless communication cell generates the dynamic probing period without changing the predetermined periodic rate between the on-state and the off-state.

8. The device of claim 5, wherein the wireless communication cell generates the dynamic probing period only if a length of the data period exceeds a predetermined threshold.

9. The device of claim 3, wherein the wireless communication cell, in operation:
receives data to be transmitted to one or more user devices during a predetermined off-period, and
delays transmission of the data until a subsequent predetermined probing period.

10. A method, performed by a small cell, comprising:
deactivating the small cell in response to a signal received from a base station; and
alternating, by the small cell, between an on-state and an off-state, wherein the small cell maintains the on-state for a predetermined probing period,
wherein the small cell maintains the off-state for a predetermined off period, and wherein the predetermined probing period is selected such that one or more user devices can detect and measure the small cell during the predetermined probing period, and
wherein the predetermined probing period and the predetermined off period are selected based on one or more types of user devices located within a coverage area of the small cell.

11. The method of claim 10, comprising generating, by the small cell, one or more signals when in the on-state, wherein the one or more signals are configured to allow the one or more user devices to detect and measure the small cell.

12. The method of claim 11, comprising alternating, by the small cell, between the on-state and the off-state at a predetermined periodic rate.

13. The method of claim 11, comprising, transitioning, by the small cell, to the on-state during a predetermined off-period to transmit data to one or more user devices.

14. The method of claim 13, comprising, extending, by the small cell, a data transmission period by an extension period to generate a dynamic probing period, wherein the dynamic probing period has a length greater than or equal to a length of the predetermined probing period.

15. The method of claim 13, comprising, delaying, by the small cell, a subsequent predetermined probing period by a predetermined off period after a dynamic probing period.

16. The method of claim 11, comprising:
receiving, by the small cell, data for transmission to one or more user devices; and
delaying, by the small cell, transmission of the data until a subsequent predetermined probing period.

17. The method of claim 11, comprising adjusting, by the small cell, the predetermined probing period, the predetermined off period, or both based on one or more parameters of a set of the one or more user devices located within the coverage area of the small cell.

18. The method of claim 11, comprising generating, by the small cell, a discovery signal configured to allow off-cell discovery of the small cell, wherein the discovery signal is generated by the small cell in the off-state.

19. The method of claim 11, comprising, receiving, by the small cell, a discovery signal transmitted by a user device, wherein the discovery signal is receivable by the small cell in the off-state, and wherein the discovery signal is configured for off-cell discovery of the small cell.

20. A heterogeneous network, comprising:
a base station comprising a base coverage area; and
at least one small cell comprising a cell coverage area, wherein the small cell is located within the base coverage area, and wherein the small cell is configured to:
transition to an off-state in response to a signal generated by the base station; and
alternate between an on-state and the off-state,
wherein the small cell maintains the on-state for a predetermined probing period,
wherein the small cell maintains the off-state for a predetermined off period,
wherein the predetermined probing period is selected such that one or more user devices can detect and measure the small cell during the predetermined probing period,
wherein the small cell is configured to alternate between the on-state and the off-state periodically, and
wherein the predetermined probing period and the predetermined off period are selected based on one or more types of user devices located within the cell coverage area.

21. The heterogeneous network of claim 20, wherein the small cell is further configured to:
transition to the on-state to transmit data during a predetermined off period;
extend a data transmission period by an extension period to generate a dynamic probing period, wherein the dynamic probing period has a length greater than or equal to a length of the predetermined probing period; and
delay a subsequent predetermined probing period by a predetermined off period after the dynamic probing period.

* * * * *